United States Patent
Arnston

[15] 3,702,081
[45] Nov. 7, 1972

[54] STEERING COLUMN ASSEMBLY
[72] Inventor: Gary L. Arnston, Lansing, Mich.
[73] Assignee: General Motors Corporation, Detroit, Mich.
[22] Filed: Aug. 20, 1971
[21] Appl. No.: 173,493

[52] U.S. Cl. .................................................. 74/492
[51] Int. Cl. .............................................. B62d 1/18
[58] Field of Search ............................... 74/492, 493

[56] References Cited

UNITED STATES PATENTS 3,415,140   12/1968   Bien et al. .................... 74/492

*Primary Examiner*—Milton Kaufman
*Attorney*—F. Finken et al.

[57] ABSTRACT

An automobile steering column assembly wherein an axially movable columnar member of a collapsible energy absorbing column structure has secured thereto a bracket having lugs thereon which lugs are releasably fastened to a combination guide and support member rigidly mounted on the vehicle body remote from the instrument panel structure of the latter. Under impact loading on the column structure the lugs are released for sliding movement relative to the combination member, the latter having a bearing surface and restraining flanges which constrain the bracket and lugs to move in a predetermined path of motion during collapse of the column structure to maintain the latter in an attitude effecting optimum energy absorbing performance.

2 Claims, 5 Drawing Figures

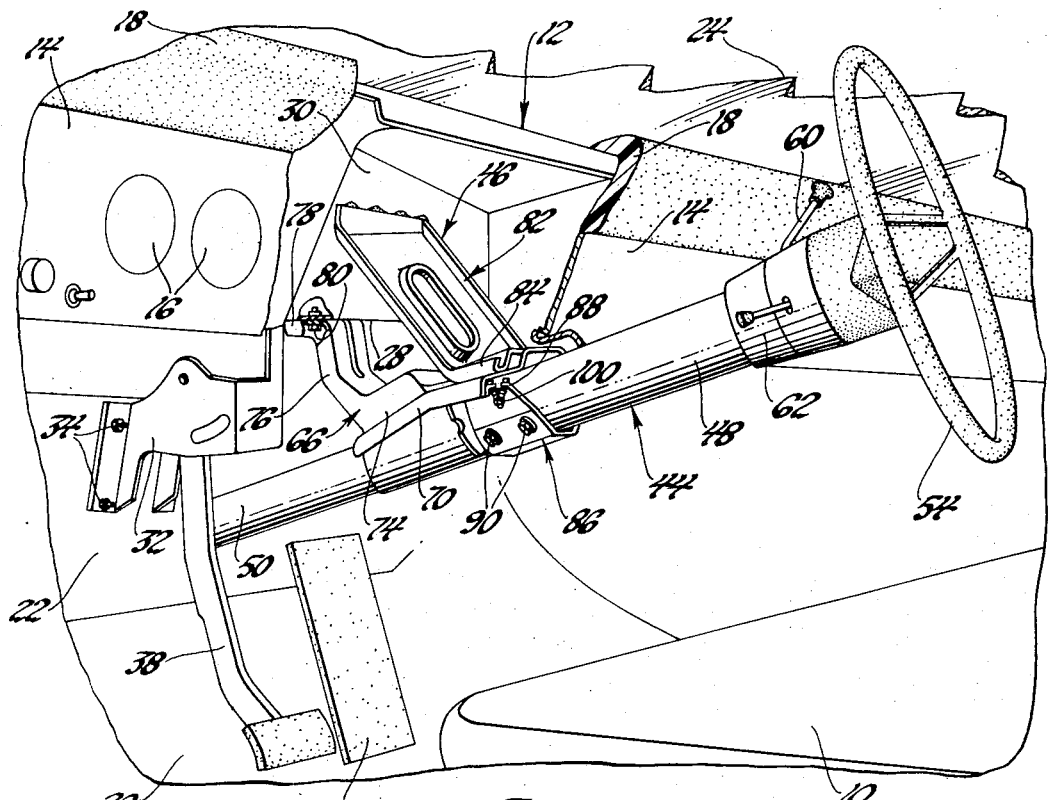

INVENTOR.
BY Gary L. Arntson

Saul Schwartz
ATTORNEY

STEERING COLUMN ASSEMBLY

This invention relates generally to automotive vehicle energy absorbing steering column assemblies including a collapsible column structure and particularly to means for controlling the attitude of the column structure during collapse thereof to achieve optimum performance.

The primary feature of this invention is that it provides an improved vehicle steering column assembly of the type including a column structure adapted for axial collapse in an energy absorbing mode under compressive impact. Another feature of this invention resides in the provision in the steering column assembly of combination support and attitude control means adapted to normally rigidly support the column structure remote from the instrument panel structure of the vehicle body and to control the attitude of the column structure during energy absorbing collapse of the latter to achieve optimum performance. Yet another feature of this invention resides in the provision of a combination support and guide member rigidly mounted on the vehicle body remote from the instrument panel structure thereof and adapted to releasably support a bracket rigidly attached to the column structure and movable axially therewith during energy absorbing collapse, the combination member defining a path of motion for the bracket during collapse to thereby positively control the attitude of the column structure to effect optimum energy absorbing performance.

These and other features of this invention will be readily apparent from the following specification and from the drawings, wherein:

FIG. 1 is a fragmentary partially broken away perspective view of the interior of an automobile vehicle body having a steering column assembly according to this invention;

FIG. 2 is a fragmentary partially broken away side elevational view of an automobile vehicle body having a steering column assembly according to this invention;

Figure 3:
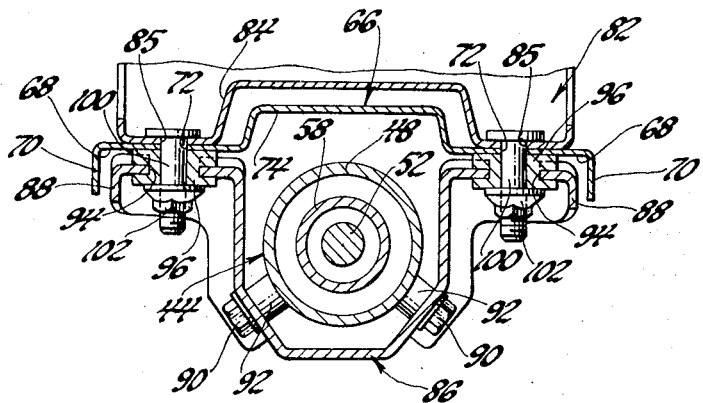
FIG. 3 is an enlarged sectional view taken generally along the plane indicated by lines 3—3 in FIG. 2.

Referring now to FIG. 1 of the drawings, a portion of the interior of an automobile vehicle body is thereshown which includes a front seat 10 and an instrument panel structure 12 having a vertical panel 14 supporting a plurality of gauges 16 or the like, the vertical panel having affixed thereto a resilient energy absorbing pad 18. The front seat 10 is conventionally mounted on a floor panel 20, the latter merging with a generally vertical firewall 22. The firewall extends upwardly behind the instrument panel structure generally to the lower marginal edge of a windshield 24.

As seen best in FIG. 2, an L-shaped portion of the firewall 22, structurally rigid with respect to the vehicle body is situated behind the vertical panel 14 and includes a horizontal side 28 and a vertical side 30. A brake support bracket 32 is fastened to the firewall below the L-shaped portion and to horizontal side 28 by a plurality of bolts 34 and 36, and pivotally supports a brake pedal 38, the latter being situated adjacent a conventional accelerator pedal 40.

Referring particularly to FIGS. 1, 2 and 3, a steering column assembly according to this invention is supported on the vehicle body and includes a column structure 44 of the collapsible energy absorbing type and a mounting arrangement 46. The column structure 44 is generally identical to that disclosed in U.S. Pat. No. 3,392,599, issued July 16, 1968 in the name of R. L. White and assigned to the Assignee of this invention, but may be of any known construction wherein one portion of the column structure is restrained against axial movement and another portion is adapted for axial movement during energy absorbing collapse. Generally, the column structure 44 includes an outer columnar member 48 disposed about an inner columnar member 50 for telescoping movement relative thereto, the inner columnar member projecting from the interior of the vehicle body through an aperture in the firewall 22. As seen best in FIGS. 2 and 3, the column structure 44 further includes a steering shaft 52 rotatably supported at the top of the outer columnar member 48 and at the bottom of the inner columnar member 50. The steering shaft has a steering wheel 54 attached at one end thereof and is connected to the vehicle steering gear, not shown, at the other end through a flexible coupling 56. A cylindrical shift tube 58 surrounds the steering shaft and is connected to a selector lever 60 through a rotatable shift bowl 62 and, below the firewall 22, to the vehicle transmission through conventional linkage, not shown.

The inner columnar member 50 is attached to the firewall 22 and restrained against axial bodily movement by an anchor 64. The outer columnar member is axially bodily movable but normally maintained in fixed relation to the inner columnar member by energy absorbing means, not shown, disposed between the two members. Under an axial compressive impact, the column structure collapses in an energy absorbing mode with the outer columnar member moving axially leftwardly and telescoping over the inner columnar member.

Figure 4:
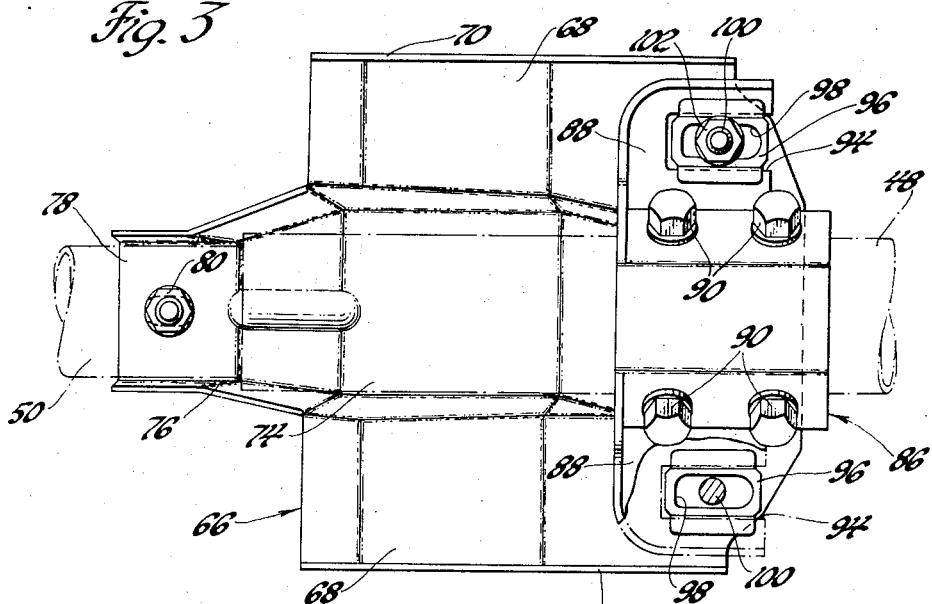
FIG. 4 is an enlarged view taken generally along the plane indicated by lines 4—4 in FIG. 2; and, FIG. 5 is an enlarged view of a portion of FIG. 1 showing the column structure in a collapsed condition.

Referring now to FIGS. 2, 3 and 4, the mounting arrangement 46 includes a combination guide and support member 66 having a pair of coplanar bearing surfaces 68. Each bearing surface is bounded along its outboard edge by an integral longitudinal side flange 70 and has an aperture 72 therein adjacent the forward or leading edge thereof, FIG. 3. The bearing surfaces are joined by an integral relieved web portion 74 which web portion is extended at one end to form a structurally rigid leg 76 terminating in a flange 78, the flange 78 being rigidly attached to the horizontal side 28 of the firewall by a bolt 80, FIG. 2. A generally flat strut 82, reinforced for rigidity, includes a flange 84 having spaced apertures 85 therein, the flange being preformed to fit over the bearing surfaces 68 and the interconnecting web 74 with the apertures 85 in register with the apertures 72 in the combination member. The strut is welded or otherwise rigidly secured to vertical side 30 of the firewall.

Figure 5:
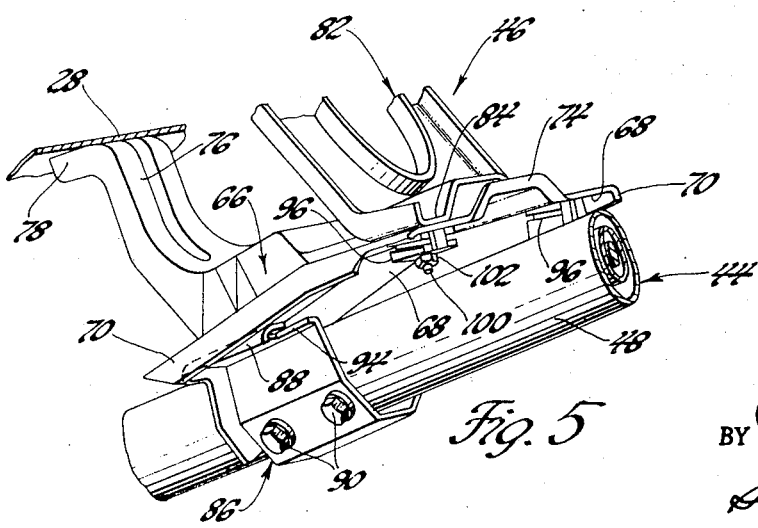

As seen best in FIGS. 3, 4 and 5, the mounting arrangement further includes a bracket 86 having integral therewith a pair of side projections or lugs 88. The bracket is rigidly attached to the outer columnar member 48 of the column structure by a plurality of bolts 90, the bracket being maintained a predetermined distance away from the columnar member 48 by a plurality of spacers 92. Each lug 88 is oriented transversely of the column structure and includes an outwardly opening slot 94, FIG. 4, adapted to receive respective ones of a pair of mounting capsules 96, each mounting capsule having an elongated aperture 98 therein. Each capsule is releasably secured to the corresponding lug by a series of plastic shear pins, not shown, injection molded within aligned apertures in the capsules and in the lugs.

The bracket 86 is located along the length of the outer columnar member 48 such that in the normal uncollapsed condition of the column structure, FIGS. 1 and 2, the elongated apertures 98 in the mounting capsules 96 register with the registered apertures 85 and 72 in the strut and the combination member respectively. As seen best in FIG. 3, respective ones of a pair of bolts 100 project through the registered apertures and are retained by respective ones of a pair of nuts 102. With the nuts 102 tightened against the mounting capsules, the combination member and the strut 82 are joined into a structurally rigid unit forming a support for the steering wheel end of the column structure 44. The nuts 102 also function to retain capsules 96 and thus hold the column structure against the support provided by the combination member and the strut, the column structure being oriented for optimum energy absorbing performance under impact loading and for convenient manual operation of the steering wheel 54.

A typical operational sequence of the steering column assembly according to this invention is initiated by the imposition of a substantial compressive force on the steering wheel 54, as might occur during a collision. The compressive force is transferred to the outer columnar member 48 through the hub of the steering wheel with a portion of the force being directed generally axially of the column structure. The axially directed force component tends to initiate axial bodily movement of the outer columnar member 48 and the bracket 86 but is initially resisted by the plastic shear pins securing the lugs on the bracket to the mounting capsules, the latter being rigidly fastened to the combination member 66 and strut by bolts 100 and nuts 102. When the axial force component achieves a predetermined minimum magnitude, the shear pins are fractured and the column structure is released for energy absorbing collapse. Simultaneously, however, the control over the attitude of the column structure heretofore exercised by the nuts 102 on the bolts 100 is lost, the latter two elements still being retained in the apertures in the combination member and the strut and functioning to maintain the combination member and the strut as a rigid unit, FIG. 5.

The force imposed on the steering wheel initiating collapse of the column structure normally includes a component which tends to lift the column structure up or displace it laterally. The combination member 66 prevents such movement and maintains the column structure in an attitude best suited for optimum energy absorption by constraining the lugs 88 to move in a predetermined path of motion. More particularly, subsequent to fracture of the shear pins, the lugs 88 move as a unit with the outer column member 48 and each slidably engages one of the bearing surfaces 68 which prevent any upward displacement of the lugs and, therefore, of the column structure during collapse. Further, the side flanges 70 prevent any substantial lateral displacement of the lugs 88 and, therefore, of the column structure so that the latter maintains its original alignment. The attitude of the column structure is thus controlled throughout energy absorbing collapse to achieve optimum energy absorbing performance.

It will, of course, be apparent that other types of collapsible column structures might be incorporated into the steering column assembly according to this invention. The only requirement is that the particular column structure include one portion anchored to the vehicle body and another portion adapted for axial bodily movement during energy absorbing collapse of the column structure. It will be further apparent that the combination member 66 eliminates the necessity of attaching the column structure 44 to the instrument panel structure and thus simplifies the latter and prevents interference of the column structure therewith during energy absorbing collapse.

Having thus described the invention, what is claimed is:

1. In an energy absorbing steering column assembly for an automotive vehicle body, said steering column assembly including a collapsible column structure having a first portion anchored to said vehicle body and restrained against axial bodily movement in at least one direction and a second portion adapted for axial bodily movement in said one direction during energy absorbing collapse of said column structure, the improvement comprising, a combination support and guide member, means rigidly mounting said combination member on said vehicle body, a bracket rigidly mounted on said second portion of said column structure, impact responsive means releasably securing said bracket to said combination member so that said column structure is normally substantially rigidly supported with respect to said vehicle body in a predetermined operational attitude and free for collapse upon impact, and means on said combination member defining a path of motion for said bracket during energy absorbing collapse of said column structure, said path of motion being predetermined to insure that said column structure is maintained in a predetermined attitude during energy absorbing collapse thereof.

2. In an energy absorbing steering column assembly for an automotive vehicle body having therein an instrument panel structure, said steering column assembly including a collapsible column structure having a first portion anchored to said vehicle body and restrained against axial bodily movement in at least one direction and a second portion adapted for axial bodily movement in said one direction during energy absorbing collapse of said column structure, the improvement comprising, a combination support and guide member having a bearing surface bounded on opposite sides by respective ones of a pair of integral retaining flanges, means rigidly mounting said combination member on said vehicle body remote from said instrument panel structure with each of said flanges extending generally longitudinally of said vehicle body, a bracket rigidly mounted on said second portion of said column structure and having a pair of lug portions extending laterally of said column structure, and impact responsive means releasably securing said bracket at said lug portions to said combination member generally at one end of said bearing surface between said flanges so that said column structure is normally substantially rigidly supported with respect to said vehicle body independently of said instrument panel structure in an operational attitude and free for collapse upon impact, said bracket at said lug portions slidably engaging said combination member on said bearing surface and between said flanges during energy absorbing collapse of said column structure and said bearing surface and said flanges cooperating in defining a path of motion for said bracket insuring that said column structure is maintained in a predetermined attitude during energy absorbing collapse thereof.

* * * * *

PO-1050
(5/69)

UNITED STATES PATENT OFFICE
CERTIFICATE OF CORRECTION

Patent No. __3,702,081__  Dated __November 7, 1972__

Inventor(s) __Gary L. Arntson__

It is certified that error appears in the above-identified patent and that said Letters Patent are hereby corrected as shown below:

On Abstract Page, change "Inventor: Gary L. Arnston"

to -- Inventor: Gary L. Arntson --.

Signed and sealed this 1st day of May 1973.

(SEAL)
Attest:

EDWARD M. FLETCHER, JR
Attesting Officer

ROBERT GOTTSCHALK
Commissioner of Patents